US007565563B2

(12) United States Patent
Gappisch et al.

(10) Patent No.: US 7,565,563 B2
(45) Date of Patent: Jul. 21, 2009

(54) NON-VOLATILE MEMORY ARRANGEMENT AND METHOD IN A MULTIPROCESSOR DEVICE

(75) Inventors: Steffen Gappisch, Zürich (CH); Hans-Joachim Gelke, Zürich (CH)

(73) Assignee: NXP B.V., Eindhoven (NL)

( * ) Notice: Subject to any disclaimer, the term of this patent is extended or adjusted under 35 U.S.C. 154(b) by 1302 days.

(21) Appl. No.: 10/196,047

(22) Filed: Jul. 15, 2002

(65) Prior Publication Data

US 2003/0033490 A1 Feb. 13, 2003

(30) Foreign Application Priority Data

Jul. 18, 2001 (EP) ................... 01117358

(51) Int. Cl.
*G06F 13/16* (2006.01)
*G06F 1/14* (2006.01)
(52) U.S. Cl. ................ 713/401; 711/149; 711/150; 711/151; 711/103; 713/375; 713/400
(58) Field of Classification Search ............... 713/400, 713/401, 500, 501, 502, 503, 600, 601, 375; 711/149, 150, 151, 103
See application file for complete search history.

(56) References Cited

U.S. PATENT DOCUMENTS

| 4,453,210 | A | * | 6/1984 | Suzuki et al. ................. 714/25 |
| 4,698,753 | A | * | 10/1987 | Hubbins et al. ............. 709/209 |
| 4,827,401 | A | * | 5/1989 | Hrustich et al. ............. 713/400 |
| 5,247,642 | A | | 9/1993 | Kadlec et al. ................ 395/425 |
| 5,263,150 | A | * | 11/1993 | Fan ............................. 711/150 |
| 5,305,452 | A | | 4/1994 | Khan et al. .................. 395/550 |
| H1385 | H | * | 12/1994 | Stickel et al. ................. 460/45 |
| 5,438,666 | A | * | 8/1995 | Craft et al. .................... 710/22 |
| 5,845,097 | A | * | 12/1998 | Kang et al. ................. 710/117 |
| 5,930,502 | A | * | 7/1999 | Picco et al. ................. 713/501 |
| 6,032,219 | A | * | 2/2000 | Robinson et al. .............. 711/1 |
| 6,226,717 | B1 | * | 5/2001 | Reuter et al. ................ 711/147 |
| 6,266,745 | B1 | * | 7/2001 | de Backer et al. ........... 711/147 |
| 6,473,821 | B1 | * | 10/2002 | Altmayer et al. ............ 710/240 |
| 2002/0087828 | A1 | * | 7/2002 | Arimilli et al. ................ 712/32 |

* cited by examiner

*Primary Examiner*—Thomas Lee
*Assistant Examiner*—Fahmida Rahman
(74) *Attorney, Agent, or Firm*—Lisa K. Jorgenson; Robert Iannucci; Seed IP Law Group PLLC

(57) ABSTRACT

This invention relates to multiprocessor arrangements with shared non-volatile memory and the design of the access control of this memory, in particular to such memories embedded or integrated into circuits (ICs) as used in mobile phones, PDAs or laptop computers. To reduce power consumption, the processor clock rates are often varied depending on the current performance requirements. Differing clock rates of processors sharing a non-volatile memory leads to relatively long read access times of the latter, since the particular microprocessor fetching the data from the memory is usually halted until the data are available. When dual or multi-port non-volatile memory and multiple asynchronous clocks are used, access times are even longer since clock synchronization between the ports is necessary. The present invention overcomes this problem by providing a plurality of wait timers, preferably one dedicated to each processor, advantageously each being clocked synchronously with its associated processor. This shortens the access times considerably and thus improves overall performance without power penalty.

6 Claims, 4 Drawing Sheets

NON-VOLATILE MEMORY ARRANGEMENT AND METHOD IN A MULTIPROCESSOR DEVICE

Figure 1:
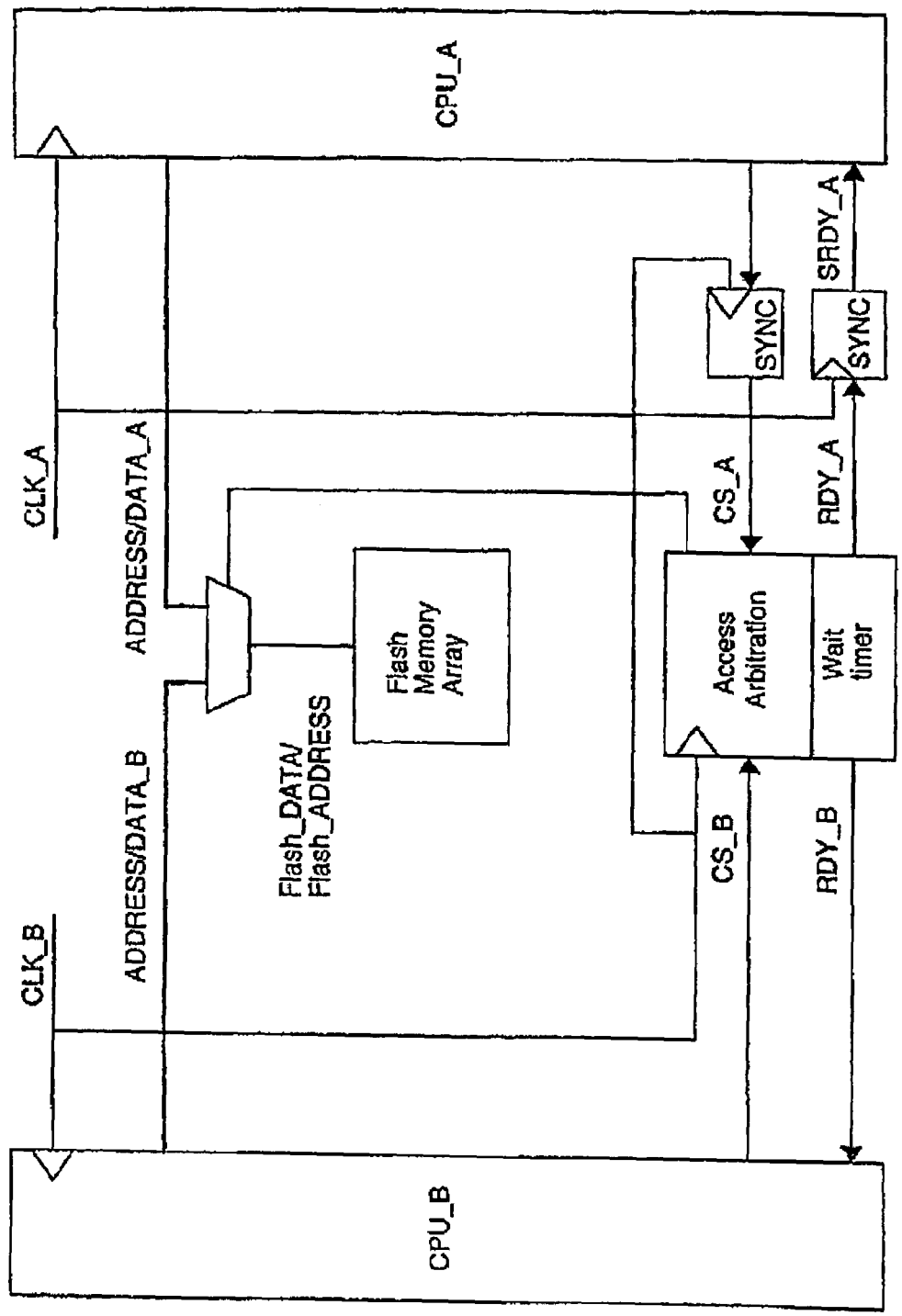

The present invention generally relates to portable microprocessor applications like mobile phones, PDAs or laptop computers which usually are battery-powered and therefore required to deliver high processing performance at low power consumption. The necessary power savings are often accomplished by varying the processor clock rates depending on the current performance requirements of the system. Apart from that is the performance of such devices often improved by providing multiple processors, e.g. several micro controllers and/or DSPs in mobile phones. Also, such multiprocessor-equipped devices often use shared memory arrangements to provide communications as well as a shared resource between the processors.

When using a non-volatile memory, e.g. a flash memory, as shared memory, the relatively long read access times of the latter, typically in the range of 40-80 ns, is a crucial limit for the working speed of the whole multiprocessor device since the particular microprocessor fetching the data from the memory is usually halted until the data are available. In systems with a dual or multi-port non-volatile memory and multiple asynchronous clocks, access times are even longer since clock synchronization between the ports is necessary.

Thus, decreasing these access times by optimizing the processor/memory synchronization can obviously improve the function of the whole multiprocessor-equipped device.

However, this synchronization of a non-volatile memory with one or more microprocessors is by no means easy to implement and leads to certain problems that have to be solved before such an arrangement exhibits the expected advantages. One of the issues is that, whenever synchronization is required, a time delay occurs. This is further complicated by the fact that this time delay is undetermined because it consists of a known component and an unknown component.

Khan et al describe in U.S. Pat. No. 5,305,452 a personal computer system having a single microprocessor and a bus controller driven at different frequencies. It is not disclosed or addressed, however, how to handle an arrangement with multiple microprocessors and, particularly, non-volatile or flash memories.

Another apparatus of apparently some relevance is disclosed by Kadlec et al in U.S. Pat. No. 5,247,642. It shows how to determine the cacheability of a memory address to reduce the wait state to zero. A single microprocessor with a cache and its tightly coupled, associated main memory is disclosed. In order to improve cooperation with a so-called "zero-wait-state device" like an external math coprocessor or the main memory, a fast determination circuit is provided which effects selective generation of a cache enable signal depending on the addressed device. Though Kadlec et al disclose an arrangement with more than one (micro-)processor and a common memory, there is no hint how to implement or handle an arrangement which includes a non-volatile or flash memory with its particular limits. Also, the solution chosen, i.e. the cacheability determination, is very specific and not applicable to other environments, certainly not for multiprocessor arrangements including non-volatile or flash memories.

Figure 2:
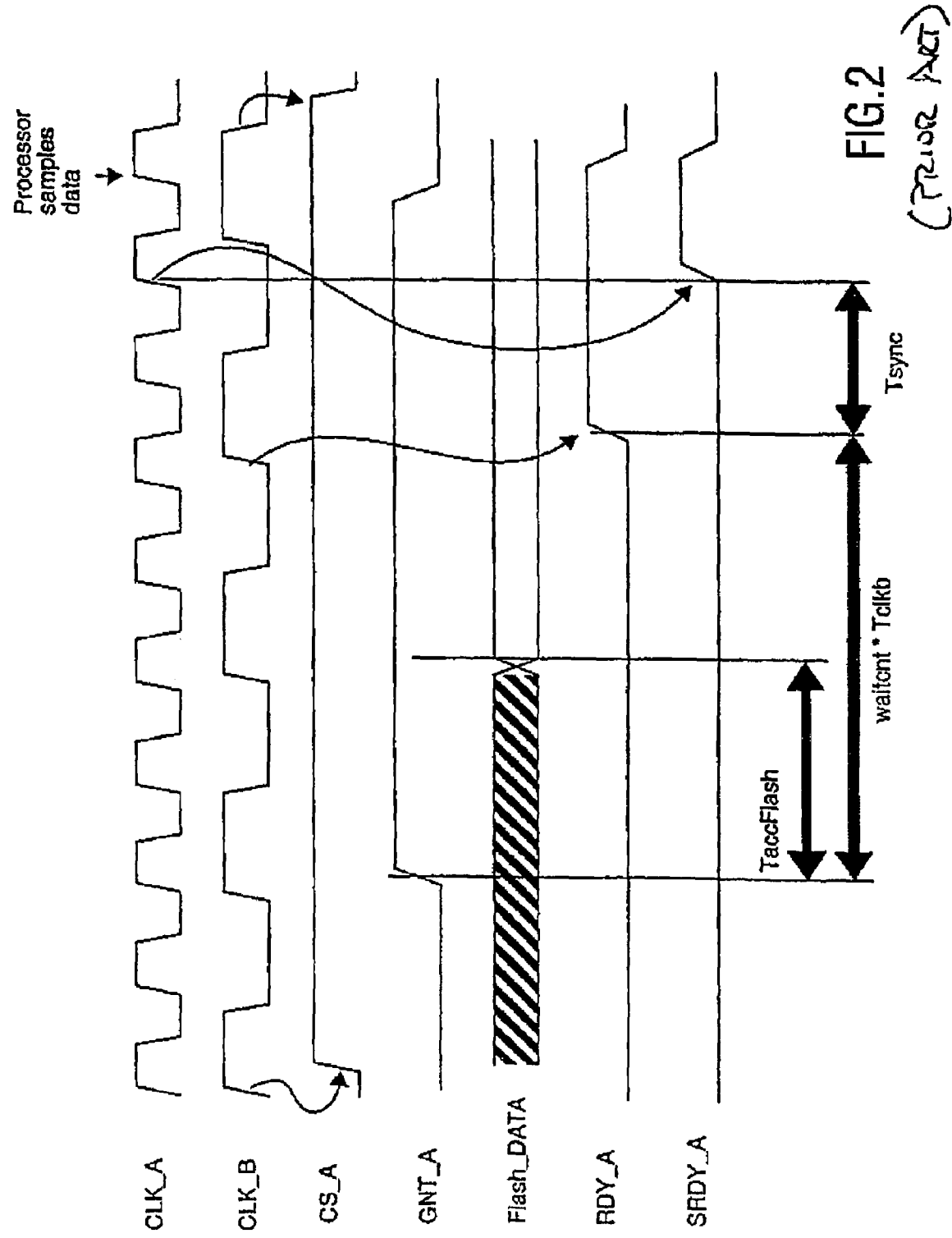
Figure 3:
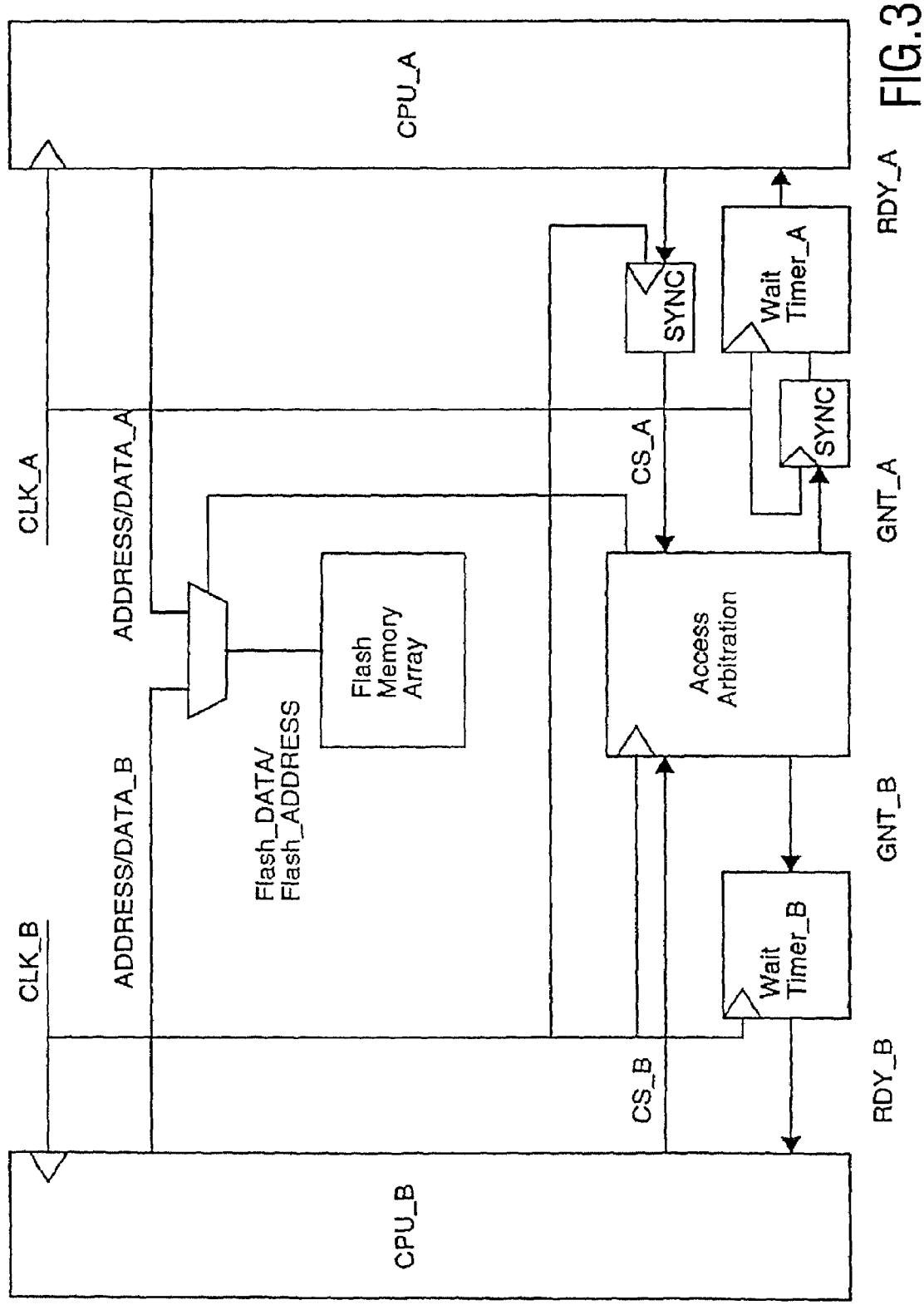
Figure 4:
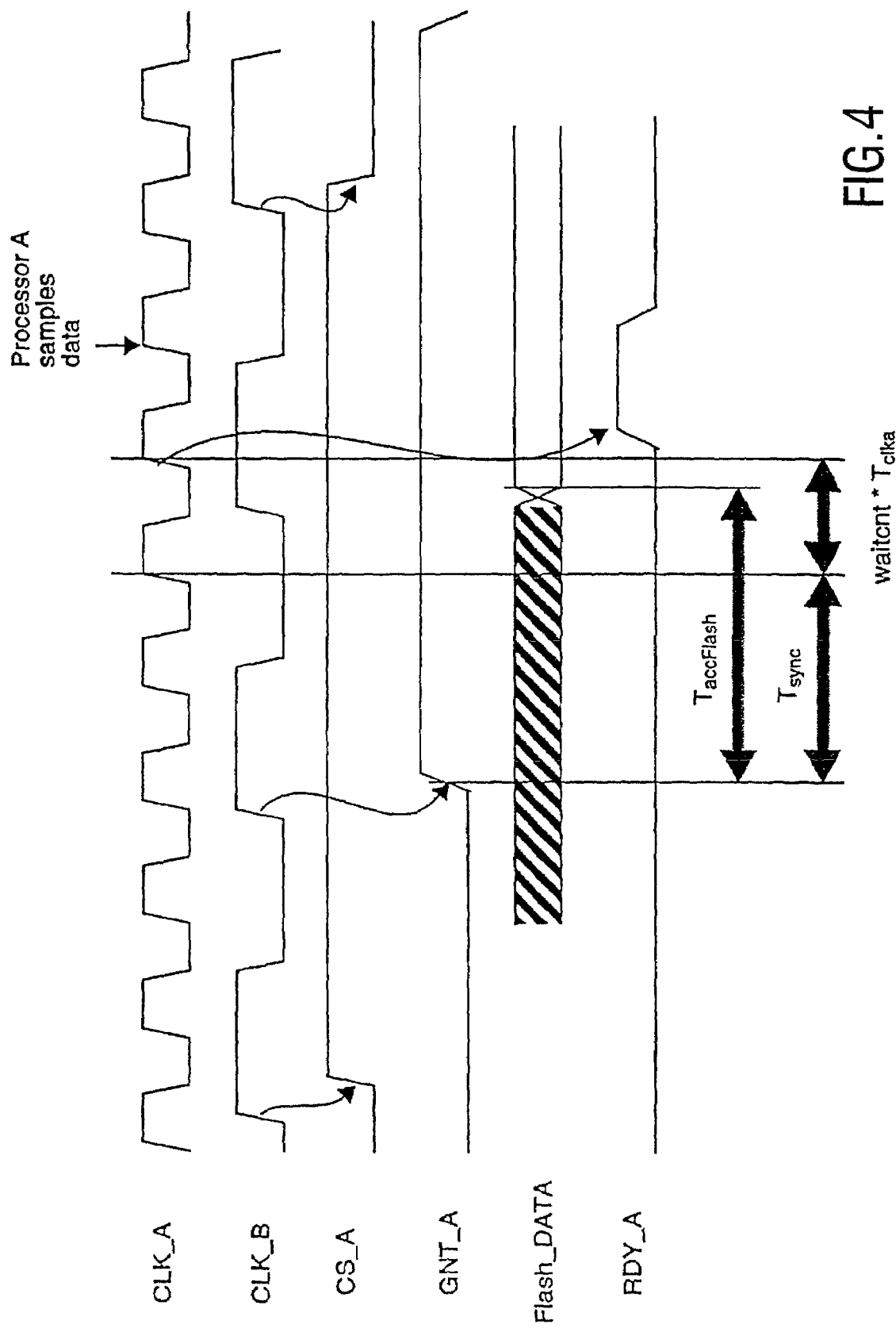

The present invention now provides a significant improvement for the problem of insufficient access speed in a multiprocessor device with a non-volatile or flash memory. Starting from a specific approach, the invention and the way in which it solves the above-identified problem shall be described in the following by way of an embodiment together with the drawings which show in FIG. 1 a non-volatile or flash memory shared by two CPUs in two clock domains;

FIG. 2 the arbitration and synchronization for a shared non-volatile memory;

FIG. 3 a shared non-volatile memory system with dedicated wait timers according to the invention; and FIG. 4 the timing of a shared memory system with dedicated wait timers according to the invention.

In principle, the present invention provides the desired improvement essentially by optimizing the synchronization between a plurality of microprocessors and one or more associated non-volatile or flash memories. The invention assures that the memory access and the synchronization delay are always optimal and independent of the clocking rate of the corresponding microprocessors, resulting in a stunning average performance improvement of 30% or more.

FIG. 1 shows a dual processor system with CPU A and CPU B. After arbitration, both CPUs have access to the non-volatile, here flash, memory array via a multiplexer. In this example, CPU B and the memory arbiter are clocked with signal CLK_B, wheras CPU A is clocked with CLK_A as shown. Arbitration is done by means of a synchronous access arbiter, labelled Access Arbitration, which grants access either to CPU A or to CPU B, depending on the arbitration algorithm. A wait timer determines when the memory data is available on its active port. This is indicated to the CPU concerned by signals RDY_A or RDY_B, respectively. Since CPU A is clocked differently from the access arbiter, signals to and from CPU A must be synchronized first, before they may be processed. This synchronization is handled by a separate synchronizer, labelled SYNC, in each direction, one for the above-mentioned signal RDY_A which, when synchronized, becomes SRDY_A and another one for signals from CPU_A to the access arbiter.

FIG. 2 shows the arbitration and synchronization process in a shared flash memory according to FIG. 1. It is assumed that clock A of the CPU A (signal CLK_A) runs at a higher rate than clock B of CPU B (signal CLK_B). Signal CS_A indicates that the CPU A wants to access the flash memory. If there are no other activities on the flash memory, the arbiter grants CPU A access to the memory. As soon as the GNT_A signal is activated, the memory array is addressed with the appropriate CPU A address and after a time $T_{accFlash}$, the data are provided to the CPU A. Flash_DATA are the data transferred from the flash or non-volatile memory. The data available indicator for CPU A is the RDY_A signal, which is controlled by a wait timer. Before the CPU A may continue its cycle, signal RDY_A must first be synchronized with signal CLK_A, which needs synchronization time $T_{sync}$. Since, in this example, the wait counter is clocked by the CPU B, the number of required wait cycles is $$T_{accFlash}/T_{clkb}.$$

The total memory access time for the CPU A is therefore $$T_{sync} + waitcnt * T_{clkb},$$

calculated after GNT_A and not including the time needed for arbitration.

The following equation determines the minimum time delay for CPU A:

$$t_{accCPUmin} = T_{syncmin} + waitcnt * T_{clkb} = T_{clka} + (T_{accFlash}/T_{clkb}) * T_{clkb}.$$

The maximum time delay is:

$$t_{accCPUmax}=T_{syncmax}+waitcnt*T_{clkb}=2T_{clka}+(T_{accFlash}/T_{clkb})*T_{clkb}.$$

The result is that the total CPU access time depends on the clock speeds of the two CPUs, i.e. CLK_A and CLK_B. If, e.g. CLK_B is set much slower than CLK_A of the CPU A—which may make sense to save power in the CPU B—the performance of the CPU A suffers, and vice versa. This is altogether undesirable because it slows down the flash memory operation.

FIG. 2 also shows that $T_{sync}$ only starts after the wait states are determined by the wait counter, causing an additional delay for the CPU A.

It is obvious that the above described system exhibits some undesirable effects:

The performance of the system depends to a large extent on the clock rates and their relation or interdependence. In other words, the clock rate of one CPU, even if this CPU is inactive, affects the access time of the other CPU to the flash or other non-volatile memory.

The wait state insertion resolution for both CPUs is always that of the slowest clock in the system.

Due to the necessary synchronization, a processor of the "opposite" clock domain receives an additional delay.

In systems with a dual or multi-port non-volatile memory and multiple asynchronous clocks, access times are even longer since clock synchronization between the ports is necessary.

For all the above issues, the present invention provides a solution. Essentially, the improvement according to the invention is the result of the following main measures:

Each CPU has its own wait timer. This wait timer is clocked by the native CPU clock.

The wait timer is triggered as soon as the arbitration is granted for a particular port. Synchronization is effected already for the grant signal. Since the minimum synchronization delay is known to the system, it can be deducted from the wait count, resulting in an additional time saving. The wait timers generate the wait time by counting the clock periods of the associated processors. Since one component, the above-mentioned "known component" of the synchronization delay, is known, it can be taken into account as part of the overall wait time and the wait count can be shortened by the amount of this known delay. This further improves the function of the design according to the invention.

FIG. 4 now shows the arbitration and synchronization process of a shared non-volatile or flash memory with dedicated wait timers according to the invention. It is assumed that clock A runs at a higher rate CLK_A than CLK_B of clock B, as shown. The signal CS_A indicates that CPU A wants to access the memory. If there are no other activities of the memory, the arbiter grants CPU A this access. As soon as the GNT_A signal is activated, the memory is addressed with the CPU A address and, after a time $T_{accFlash}$, the data are provided to the CPU A.

Signal GNT_A is synchronized to clock A, i.e. the signal CLK_A, and triggers wait timer A, shown in FIG. 3. Since synchronization already starts at the time of signal GNT_A, it is overlapped with the memory access time, provided that this access time is larger then the synchronization time. The latter is usually the case. Since wait timer A is clocked with CLK_A, the RDY_A signal can immediately be used to signal the execution control of CPU A to continue its cycle.

The synchronization of signal GNT_A with signal CLK_A needs the time $T_{sync}$. Since the minimum synchronization delay is known as one $T_{clka}$ cycle, this delay can immediately be deducted. The number of required wait cycles can therefore be calculated as $$(T_{accFlash}/T_{clka})-1.$$

The total memory access time for CPU A is thus:

$$(1-2)T_{clka}+(T_{accFlash}-1)*T_{clka}$$

(This is calculated assuming signal GNT_A became active and does not include arbitration time.)

The following equation determines the minimum time delay in the embodiment shown in FIG. 4 for CPU A:

$$t_{accCPUmin}=T_{syncmin}+waitcnt*T_{clka}=T_{clka}+(T_{accFlash}/T_{clka}-1)*T_{clka}.$$

The maximum time delay for CPU A is:

$$t_{accCPUmax}=T_{syncmax}+waitcnt*T_{clka}=2T_{clka}+(T_{accFlash}/T_{clka})*T_{clka}.$$

The result shows that the total access time for CPU A is now independent from clock B's signal CLK_B. This results in the following advantages:

The synchronization to the other or "opposite" clock domain is already done at the grant level, i.e. before data are available. Since the minimum delay of the synchronization is known to the system, it can be deducted at the beginning, i.e. at the wait timer.

No time is wasted if the clock frequencies differ significantly since the grid of inserted wait states is synchronous to both processors.

Memory access performance is independent of either of the system clocks.

Below is a comparison table of wait states inserted using a shared wait timer versus dedicated wait timers according to the invention. The benefits of the new synchronisation scheme are quite obvious. As example, a frequency of clock A (signal CLK_A) of 26 MHz is selected, while clock B (signal CLK_B) is running with 13, 26, or 39 MHz. The three columns list typical access times for the embedded non-volatile or flash memory of 40 ns, 60 ns, or 80 ns, respectively. Usually these memory access times depend on the memory's supply voltage. The table shows the number of wait cycles the CPU A has to insert for a memory fetch. It can be seen that the new approach with two dedicated wait timers saves at least one wait state for CPU A. The benefit is even bigger when CPU B runs at a lower frequency than CPU A and if the access time for the memory is long. In this case, two or even three wait cycles can be saved. All in all, the result is an average performance improvement of 30% which needs no further comment.

The following table shows the comparison between shared and dedicated wait timer application for a fixed clock A (CLK_A) frequency of 26 MHz, varying clock B frequencies, and varying memory access times in units of $T_{clka}$, i.e. "3-4" stands for "3-4 $T_{clka}$".

| CLK B | | Memory Access Time | | |
|---|---|---|---|---|
| Frequency | Wait Timer | 40 ns | 60 ns | 80 ns |
| 13 MHz | Shared | 3-4 | 3-4 | 5-6 |
| | Dedicated | 2-3 | 2-3 | 3-4 |
| 26 Mhz | Shared | 3-4 | 3-4 | 4-5 |
| | Dedicated | 2 | 2-3 | 3-4 |
| 39 MHz | Shared | 3-4 | 3-4 | 4-5 |
| | Dedicated | 2-3 | 2-3 | 3-4 |

The invention can be particularly beneficially applied to arrangements in which high integration of non volatile memory with microprocessors is required, such as mobile phones, personal digital assistants, GPS systems, car navigation devices etc., and, though the invention has been shown in a single embodiment only, a person skilled in the art will be able to introduce modifications and variations according to the above-described principle without departing from the gist of the invention and the scope of the appended claims.

The invention claimed is:

1. A method for synchronizing a plurality of microprocessors with differing clock speeds and one or more non-volatile memories shared by two or more of said microprocessors, the memory access being controlled by an arbiter, the method comprising the steps of:

assuring that a separate wait count is provided for each of said microprocessors wherein the wait count is generated by counting clock periods of the associated microprocessor;

triggering each said wait count by a grant signal from said arbiter wherein before the wait count is triggered upon arbitration grant for a selected one of the non-volatile memories or a selected port of a selected one of the non-volatile memories, a predetermined synchronization delay is deducted from the wait count; and separately synchronizing the memory access for each of said microprocessors.

2. The method according to claim 1, wherein synchronization of the memory access starts simultaneously with the grant signal from the arbiter, overlapping with the memory access time.

3. The method according to claim 1, wherein the wait count is triggered as soon as arbitration is granted for the selected one of the non-volatile memories or the selected port of the selected one of the non-volatile memories.

4. A microprocessor device comprising:

a plurality of microprocessors with differing clock speeds;

one or more non-volatile memories shared by two or more of said microprocessors; and an arbiter configured to control memory access to the one or more non-volatile memories, wherein a separate wait count is provided for each of said microprocessors, the wait count being generated by counting clock periods of the associated microprocessor; a grant signal from said arbiter being operative to trigger each said wait count, wherein before the wait count is triggered upon arbitration grant for selected one of the non-volatile memories or a selected port of a selected one of the non-volatile memories, a predetermined synchronization delay is deducted from the wait count; and wherein the memory access is synchronized for each of said microprocessors.

5. The device of claim 4, wherein synchronization of the memory access starts simultaneously with the grant signal from the arbiter, overlapping with the memory access time.

6. The device of 4, wherein the wait count is triggered as soon as arbitration is granted for the selected one of the non-volatile memories or the selected port of the selected one of the non-volatile memories.

\* \* \* \* \*